(12) United States Patent
Koren et al.

(10) Patent No.: US 10,887,347 B2
(45) Date of Patent: Jan. 5, 2021

(54) NETWORK-BASED PERIMETER DEFENSE SYSTEM AND METHOD

(71) Applicant: RADWARE, LTD., Tel Aviv (IL)

(72) Inventors: Yaron Koren, Hod-HaSharon (IL); Oren Ben Yoav, Netanya (IL)

(73) Assignee: Radware, Ltd., Tel Aviv (IL)

( * ) Notice: Subject to any disclaimer, the term of this patent is extended or adjusted under 35 U.S.C. 154(b) by 172 days.

(21) Appl. No.: 15/336,254

(22) Filed: Oct. 27, 2016

(65) Prior Publication Data
US 2018/0124090 A1    May 3, 2018

(51) Int. Cl.
*H04L 9/00* (2006.01)
*H04L 29/06* (2006.01)

(52) U.S. Cl.
CPC .......... *H04L 63/20* (2013.01); *H04L 63/1416* (2013.01)

(58) Field of Classification Search
CPC ................... H04L 63/1433; H04L 63/1458
See application file for complete search history.

(56) References Cited

U.S. PATENT DOCUMENTS

| | | | |
|---|---|---|---|
| 7,225,466 B2 | 5/2007 | Judge | |
| 7,849,502 B1* | 12/2010 | Bloch | H04L 29/12066 726/11 |
| 9,118,689 B1* | 8/2015 | Apte | H04L 63/104 |
| 9,426,125 B2* | 8/2016 | Phonsa | H04L 63/0218 |
| 2004/0148520 A1* | 7/2004 | Talpade | H04L 63/0227 726/22 |
| 2006/0018466 A1* | 1/2006 | Adelstein | H04L 63/1491 380/46 |
| 2007/0079366 A1 | 4/2007 | Geffner | |
| 2013/0036314 A1 | 2/2013 | Glew et al. | |

* cited by examiner

*Primary Examiner* — Beemnet W Dada
(74) *Attorney, Agent, or Firm* — M&B IP Analysts, LLC

(57) ABSTRACT

A method and system for perimeter defense of a network are provided. The method comprises receiving, at a system deployed in a perimeter of the network, traffic to or from the network, wherein the network includes a plurality of protection resources; determining, based on the received traffic, at least one potential cyber-attack; and upon determining the at least one potential cyber-attack, causing a mitigation reconfiguration of at least one protection resource of the plurality of protection resources, wherein the mitigation reconfiguration includes reconfiguring each of the at least one protection resource to mitigate the at least one potential cyber-attack.

21 Claims, 5 Drawing Sheets

NETWORK-BASED PERIMETER DEFENSE SYSTEM AND METHOD

TECHNICAL FIELD

The present disclosure relates generally to cyber security in network systems, and more particularly to signaling network elements based on fluctuations in incoming traffic patterns.

BACKGROUND

With the increasing use of computers in modern society, computer systems have become increasingly subject to cyber-attacks intended to disrupt the systems, to steal data, or both. Accordingly, the field of cyber security has developed to combat such cyber-attacks. Cyber security is particularly important in networked systems, where multiple computer resources interact to provide sharing of, for example, files and applications. Each networked system may require different cyber security resources in order to be effectively covered. Accordingly, many networked system owners choose to implement customized cyber security measures to combat potential threats to their particular systems. These requirements and corresponding measures may be more significant in large scale networks for communicating among numerous resources.

An example network diagram 100 illustrating a typical network configuration is illustrated in FIG. 1. The example network diagram 100 illustrates a wide area network (WAN) 110 (e.g., the Internet) and a localized network 120. The WAN 110 allows communication of data between the localized network 120 and other localized networks (not shown). The localized network 120 may be, for example, a local area network (LAN). The localized network 120 and the entities included therein may make up a datacenter. It is therefore often desirable to protect the localized network 120 from malicious attacks.

In the example network diagram 100, the localized network 120 includes a plurality of security services (sec serv) 130-1 through 130-n (hereinafter referred to individually as a security service 130 and collectively as security services 130, merely for simplicity purposes), an application delivery controller (ADC) 140, a plurality of web servers 150, and a plurality of databases 160-1 through 160-m (hereinafter referred to individually as a database 160 and collectively as databases 160, merely for simplicity purposes). The security services 130 may include, for example, firewalls, web application firewalls (WAFs), intrusion detection systems (IDSs), intrusion prevention systems (IPSs), and other systems configured to control application availability. The ADC 140 performs, among other things, load balancing of traffic directed to the web servers 150 and the database 160.

Traffic directed to the web servers 150 and the databases 160 arrives at the security services 130 and is directed to the ADC 140. Harmful traffic arriving at the security services 130 or the ADC 140 may result in interference with operations of the security services 130 or of the ADC 140. As a result, the security services 130 and the ADC 140 may fail to adequately protect against such harmful traffic or, in some cases, may exacerbate issues caused by such harmful traffic.

Further, even if the security services 130 and the ADC 140 are configured to protect against specific kinds of cyber-attacks, they are typically not capable of robust mitigation of various kinds of attacks. As an example, a typical ADC may be configured to mitigate particular kinds of DoS or DDoS attacks, but cannot mitigate all such DoS and DDoS attacks.

Additionally, each security service is typically configured to mitigate particular types of attacks and cannot defend against other types of attacks.

Additionally, existing solutions face challenges in coordinating defense, particularly against larger scale or more complex attacks. Specifically, each element of a localized network in charge of monitoring or security enforcement typically operates independently of other elements. Accordingly, harmful traffic may not be mitigated until reaching a particular security element. This issue is particularly problematic during denial of service (DoS) or distributed DoS (DDoS) attacks, wherein failure to prepare for or otherwise mitigate the attacks in advance may still result in overwhelming of network elements.

Furthermore, due to the static nature of the current solutions to detect and mitigate cyber-attacks in networks, such solutions are not scalable and cannot be adapted to changes in the architecture and resources' allocations in the networks in an efficient way. Also, such solutions are not dynamic and cannot be adapted to dynamically changed cyber-attack campaign, an in particular multi-vector attack, and the dynamics of modern networks and applications.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for perimeter defense of a network. The method comprises receiving, at a system deployed in a perimeter of the network, traffic to or from the network, wherein the network includes a plurality of protection resources; determining, based on the received traffic, at least one potential cyber-attack; and upon determining the at least one potential cyber-attack, causing a mitigation reconfiguration of at least one protection resource of the plurality of protection resources, wherein the mitigation reconfiguration includes reconfiguring each of the at least one protection resource to mitigate the at least one potential cyber-attack.

Some embodiments disclosed herein also include a system for perimeter defense system for protecting a network. The system comprises a processing circuitry; and a memory, the memory containing instructions that, when executed by the processing circuitry, configure the perimeter defense system to: receive traffic to or from the network, wherein the perimeter defense system is deployed in a perimeter of the network, wherein the network includes a plurality of protection resources; determine, based on the received traffic, at least one potential cyber-attack; and upon determining the at least one potential cyber-attack, cause a mitigation reconfiguration of at least one protection resource of the plurality of protection resources, wherein the mitigation reconfiguration includes reconfiguring each of the at least one protection resource to mitigate the at least one potential cyber-attack.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
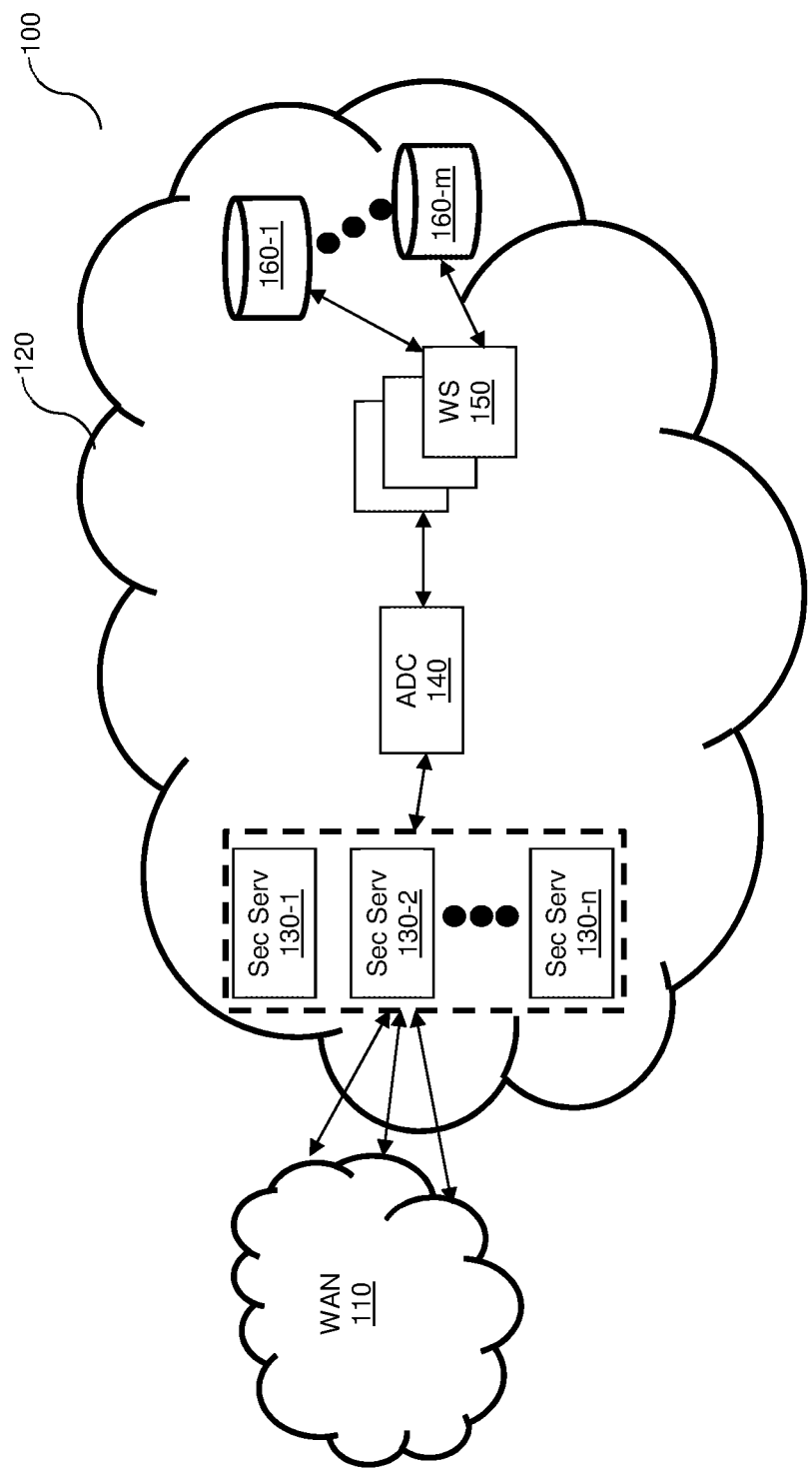
FIG. 1 is a network diagram illustrating a typical localized network configuration.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for perimeter defense of network systems. In an embodiment, upon determination of a potential cyber-attack, degradation of quality of service level, or both, bi-directional signaling is utilized to determine and cause a reconfiguration of at least one security service or application, thereby enabling defense of the protected entities. In some embodiments, the at least one security service or application may be caused to be reconfigured again once normal traffic has resumed. In another embodiment, the bi-directional signaling is utilized to determine a reconfiguration of at least one security service or application for guaranteeing a security service agreement (SLA).

Figure 2:
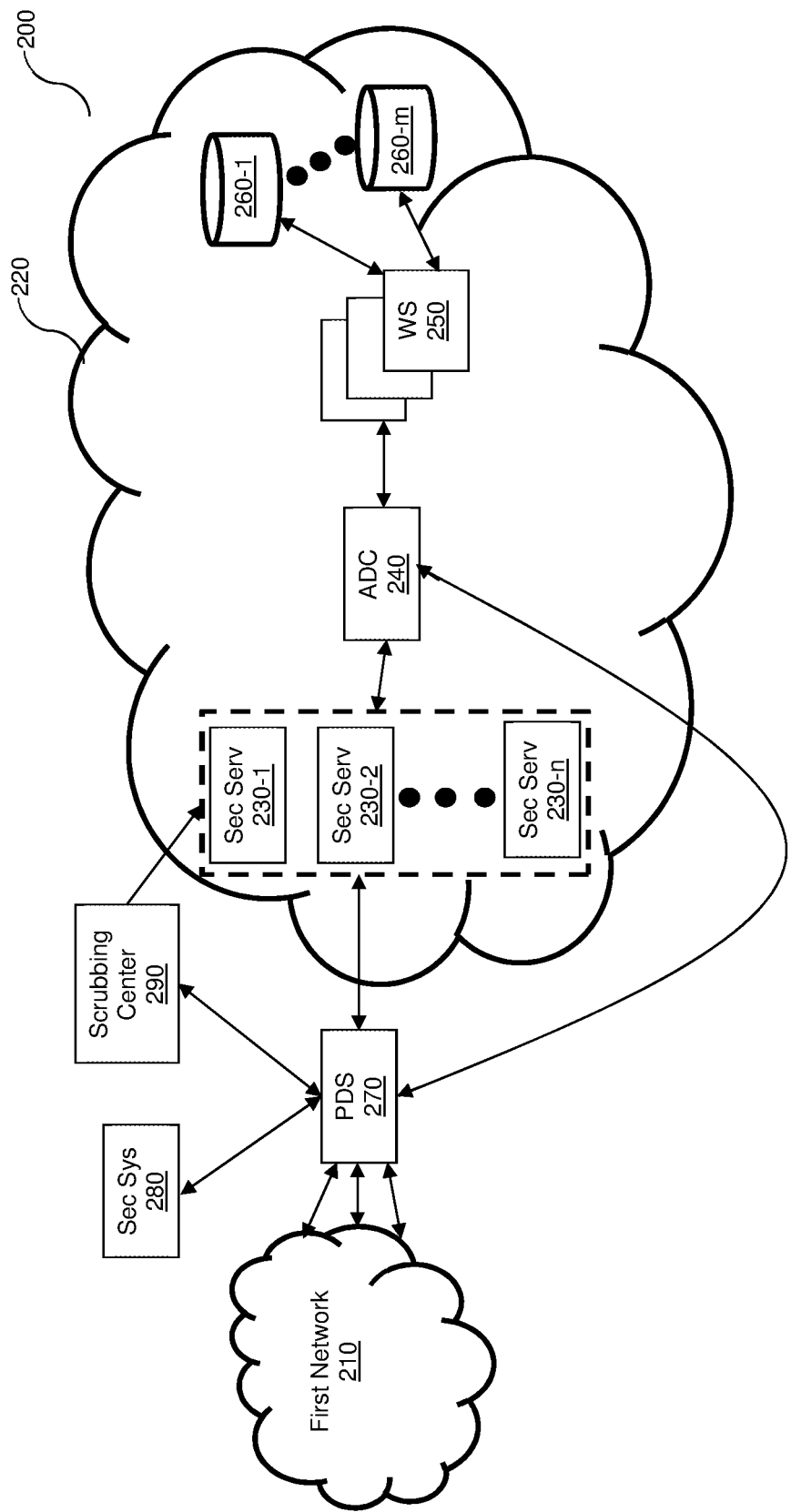
FIG. 2 is a network diagram illustrating deployment of a perimeter defense system according to an embodiment.

FIG. 2 shows an example network diagram 200 illustrating deployment of a perimeter defense system (PDS) 270 according to an embodiment. The example network diagram 200 illustrates a first network 210, a second network 220, the perimeter defense system 270, a security system (sec sys) 280, and a scrubbing center 290. In an embodiment, the perimeter defense system 270 is deployed in-line between the first and second networks 210 and 220.

The first network 210 is any network allowing communication of data to the devices in the second network 220 and other localized networks (not shown). The first network may be, but is not limited to, a wide area network (WAN), the Internet, an ISP network, and the like. The second network 220 may be a network of an organization including services, devices, machines, and other entities to be protected, for which a SLA should be maintained, or both (such entities collectively referred to hereinafter as protected entities, merely for simplicity purposes). The second network 220 may be or may include, but is not limited to, a local area network (LAN), a datacenter, a cloud-computing platform (such as a public cloud, a private cloud, or a hybrid cloud), and so on.

In the example network diagram 200, the second network 220 includes a plurality of security services (sec serv) 230-1 through 230-$n$ (hereinafter referred to individually as a security service 230 and collectively as security services 230, merely for simplicity purposes), an application delivery controller (ADC) 240, a plurality of servers 250, and a plurality of databases 260-1 through 260-$m$ (hereinafter referred to individually as a database 260 and collectively as databases 260, merely for simplicity purposes). The security services 230 may include, but are not limited to, firewalls, web application firewalls (WAFs), intrusion detection systems (IDSs), intrusion prevention systems (IPSs), and other systems configured to control application availability. The servers 250 and the databases 260 may host protected entities, such as applications, services, sensitive data, and so on. The servers 250 may include web servers, application servers, and so on.

The ADC 240 at least performs load balancing of traffic directed to the web servers 250. The ADC 240 may also be configured to select ISP links, where such a selection may be based on load, cost, proximity, combinations thereof, and the like. The functionality of the ADC 240 is also configurable.

The perimeter defense system 270 is configured to receive incoming traffic from the first network 210 and outgoing traffic from the second network 220. In an embodiment, the perimeter defense system 270 is configured to operate as an attack detector or to receive, from an attack detector, an attack indication associated with the incoming and outgoing traffic flows. When acting as an attack detector, the perimeter defense system 270 is configured to analyze incoming and outgoing traffic flows to detect cyber-attacks. Such detection is based on detection of abnormalities in the traffic flows. The detected cyber-attacks may include, for example, DoS, DDoS, WAP, and so on.

In an example deployment, an attack-detector is configured to process traffic for the purpose of detecting cyber-attacks. In a further deployment, the security system 280 is configured to detect large-scale DoS/DDoS attacks as detailed, for example, in U.S. Pat. Nos. 8,832,831 and 8,566,936., which are hereby incorporated by reference. The security system 280 may be configured as a virtual appliance or as a physical appliance.

In certain embodiments, the perimeter defense system 270 may be connected to a central controller (not shown). The central controller may be a controller of a software defined network (SDN).

In an embodiment, the perimeter defense system 270 is configured to determine whether the traffic directed to one of the protected entities includes potential cyber-attacks. The determination may include, but is not limited to, detecting a potential cyber-attack or receiving an indication that traffic is suspected as including a potential cyber-attack. Potential cyber-attacks may include, but are not limited to, DoS, DDoS, network intrusion, web application types of attacks (e.g., SQL injection, cross-site scripting, etc.), and the like.

In an embodiment, the perimeter defense system 270 may be configured to determining whether the traffic includes a potential cyber-attack by detecting potential cyber-attacks based on the traffic. For example, the detection of DoS or DDoS attacks may be based on network and bandwidth statistics, such as an average number of active connections, an average number of packets received per second, and so on. Other techniques, discussed in the related art, for detection of DoS attacks can be implemented by the perimeter defense system 270. In one example implementation, the perimeter defense system 270 is configured to implement the techniques for detecting large-scale DoS/DDoS attacks as described in the above-referenced U.S. Pat. Nos. 8,832,831 and 8,566,936.

In another embodiment, the perimeter defense system 270 may be configured to receive, from an external source (e.g., the security system 280) configured to detect potential cyber-attacks, an indication of whether the traffic directed to one of the protected entities is suspected of including a potential cyber-attack. The threat indications may include, for example, an attack alarm, a high number of active connections, a high number of packets received per second, an indication that traffic is from an IP address included in a black list, indications collected from client authentication services (e.g., Radius servers, LDAP servers, "call-back" procedures, etc.), geo analysis information (e.g., the origin of a client's traffic in comparison to other clients), a type of content, an application accessed by the client, behavioral analysis (e.g., comparing the clients' behavior to a normal behavior of the client), a combination thereof, and so on. Alternatively or collectively, the perimeter defense system 270 may be configured to analyze the attack indications to determine if a potential cyber-attack is being committed against the protected entities.

In one example configuration, the perimeter defense system 270 is connected to a scrubbing center 290, i.e., an out-of-path deployment. Upon detection of the attack, the perimeter defense system 270 may be configured to cause the diversion of traffic to the scrubbing center 290. The scrubbing center 290 performs one or more mitigation actions on the traffic and forwards legitimate clean traffic back to the second network 220. In some embodiments, the scrubbing center 290 may be, but is not limited to, an external datacenter, a cloud computing platform, a content delivery network (CDN), a service provider infrastructure, and the like.

Based on the determination of potential cyber-attacks, the perimeter defense system 270 is configured to communicate with one or more of the security services 230, with the ADC 240, or both. The communication may include bi-directional signaling between the perimeter defense system 270 and each of the one or more of the security services 230 and the ADC 240. The bi-directional signaling allows the perimeter defense system 270 to cause reconfiguration of protection resources. The protection resources may include, but are not limited to, the security services 230, the ADC 240, or a combination thereof, based on the determined potential cyber-attack. The reconfiguration may be performed in order to mitigate the effects of harmful traffic, as well as to receive information (e.g., availability, load, threats that the service 230 or the ADC 240 can be configured to mitigate, applicable service-level agreements, and the like) related to statuses of the security services 230 and the ADC 240. To this end, the perimeter defense system 270 may be configured to direct traffic to the protection resources for such traffic.

In an embodiment, the perimeter defense system 270 is set up with the topology of the second network 220. Specifically, the perimeter defense system 270 is configured with the properties of each of the protection resources, i.e., the security services 230 and the ADC 240. Such properties may include, but are not limited to, an identifier, a network address (e.g., IP address), a location within the network, security (mitigation/detection) capabilities of the service 230 or ADC 240, and so on.

In a further embodiment, the perimeter defense system 270 is configured to determine at least one input for mitigating a threat of the abnormal traffic as well as to determine at least one input recipient for each determined input. In an embodiment, each input recipient is a protection resource such as one of the security services 230 or the ADC 240. The perimeter defense system 270 is further configured to send the determined inputs to the determined input recipients, thereby causing reconfiguration of each input recipient for threat mitigation.

In yet a further embodiment, the inputs for each input recipient may include an assignment or reassignment of a workflow scheme for mitigating the attack. Such assignment and reassignment allows each workflow scheme to be utilized for multiple protected resources at once and to be utilized at different times, thereby allowing for increased flexibility via selective assignment of workflow schemes to protection resources based on, e.g., organizational or other network security needs.

The workflow scheme can be utilized for provisioning the protection resources, managing the protection resources, operating the protection resources, or a combination thereof, to protect a plurality of protected entities. That is, one workflow scheme can be applied to many protected entities. Therefore, instead of provisioning and managing the resources for each protected entity separately (there are typically thousands of such entities in a large scale network), one workflow scheme can be reused for hundreds of entities. This would simplify the provisioning and management of protection resources and network elements in the large scale network.

The workflow scheme includes information utilized to provision, manage, and configure protection services in the protection resources available in the second network 220. Such information may indicate, but is not limited to, operation regimens defining actions to be performed after provisioning as well as provisioning instructions, triggering criteria for initiating or terminating operation regimens, resources for detecting trigger events, classifications of network and mitigation resources, and the like. Each set of triggering criterion may correspond to an initiation or termination of a particular operation regimen such that, upon satisfaction of the triggering criteria, the corresponding operation regimen is initiated or terminated.

The operation regimens are typically policies defining actions to be performed and groups of resources and relevant attributes required for performing the actions. In an embodiment, each operation regimen activates a security policy that may be based on a pre-defined template. Each operation regimen may include, but is not limited to, actions to be performed in response to a cyber security threat or any other network or security events or triggers, parameters for performing the actions, and the like. The actions may include activation of any security capabilities of components of the network such as, but not limited to, provisioning additional protection services, such as detection and/or mitigation services. The mitigation services, include but are not limited to, diverting or injecting traffic), blocking traffic to one or more protected entities, notifying a user of a potential cyber security threat, and the like. In a further embodiment, the actions may further include customized actions based on, for example, user inputs.

Each triggering criterion is based on an internal or external trigger event utilized to determine when to initiate or terminate a particular operation regimen. Each trigger event may be further associated with a particular resource. For example, a trigger event may be detection of a bandwidth above 500 Gbps detected by a particular detector. In an embodiment, the triggering criteria for an operation regimen may be further based on a combination of trigger events. The triggering criteria may be based on alternative trigger events (i.e., if any of the trigger events occurs, the triggering criteria is satisfied), joint trigger events (i.e., the triggering criteria is satisfied only if two or more trigger events occur), and/or alternative combinations of trigger events (i.e., the triggering criteria is satisfied if any particular combination of trigger events occur).

Upon satisfaction of the triggering criteria for an operation regimen, actions defined in the operation regimen may be executed or terminated. A trigger event may represent any kind of event other occurring in the network, e.g., the start or end of a cyberattack from a specific type. Types of trigger events may include, but are not limited to, receiving an inbound indication, a status change, detection of suspicious traffic, a particular link in the network being saturated, and the like. Whether a criterion has been satisfied may be based on, but is not limited to, a type of trigger event detected, a severity of a detected trigger event, traffic volume related to each detected trigger event, combinations thereof, and the like.

Example trigger events may include, but are not limited to, the start or end of an attack as determined by a particular detector, bandwidth of an attack (e.g., greater than, less than, and/or equal to a particular bandwidth value), a risk of an attack (e.g., low, medium, high, combinations thereof, etc.), a particular attack protocol (e.g., TCP), a mitigator link bandwidth (e.g., greater than, less than, and/or equal to a particular bandwidth value), customized trigger events defined based on user inputs, combinations thereof, service up/down and the like.

In an embodiment, triggering criteria may be stored in a trigger table along with their corresponding operation regimens, sets of provisioning directions, or both. Each entry in the trigger table may indicate, but is not limited to, a start triggering criterion (when satisfied, triggers initiation of an operation regimen), an end triggering criterion (when satisfied, triggers termination of an operation regimen), a corresponding operation regimen, and a set of provisioning directions.

In a further embodiment, assigning the workflow scheme may further include generating or selecting a workflow scheme based on, e.g., user inputs, security needs of the specific security service 230, or both. Generating the workflow scheme based on user inputs allows for, e.g., a customer to configure or build the workflow scheme as needed. In another embodiment, the workflow scheme may be selected from among a plurality of predetermined workflow schema (i.e., "out of the box" schema). In yet another embodiment, the workflow scheme may be customized based on known security needs.

In an embodiment, the workflow scheme may be further assigned to one or more protected entities hosted by, e.g., the servers 250 and the databases 260 in the second network 220. In another embodiment, the workflow scheme may be subsequently reassigned to one or more protected entities in the second network 220. Such assignment and reassignment allows each workflow scheme to be utilized for multiple protected resources at once and/or at different times, thereby allowing for increased flexibility via selective assignment of workflow schemes to protective resources based on, e.g., organizational or other network security needs.

In an embodiment, when the perimeter defense system 270 has determined that traffic includes a potential cyber-attack, the perimeter defense system 270 may be further configured to monitor the received traffic to determine when the potential cyber-attack is over. In an embodiment, the potential cyber-attack is over when the potential cyber-attack has ended or been mitigated. In another embodiment, such an indication may be received from the security system 280. The perimeter defense system 270 may be configured to cause reconfiguration of the determined input recipients for normal operations (e.g., based on a default configuration) when it is determined that the potential cyber-attack is over. Whether a potential cyber-attack is over may be determined based on, but not limited to, whether the traffic is normal or abnormal.

The following are example scenarios utilized to demonstrate causing reconfiguration of protection resources including the security services 230, the ADC 240, or both, by the perimeter defense system 270. These example scenarios are merely illustrative, and are not limiting on the disclosed embodiments. Specifically, other kinds of attacks may be mitigated, or other configurations of the protection resources may be equally utilized without departing from the scope of the disclosure.

In a first embodiment, based on incoming traffic, the perimeter defense system 270 is configured to determine that the incoming traffic is a potential cyber-attack. Additionally, based on communications with the ADC 240, the perimeter defense system 270 determines that the ADC 240 is managed on-premises. Accordingly, the perimeter defense system 270 is configured to send inputs indicating that the ADC 240 should increase computing resources and memory resources, thereby allowing for confirmation of the applicable service-level agreement and of availability of the ADC 240. Additionally, an application performance monitoring policy may be enabled in order to commit the ADC 240 to the service-level agreement.

In a second embodiment, based on incoming traffic, the perimeter defense system 270 is configured to determine that the incoming traffic is a potential web-application type of attack. Additionally, based on communications with the security services 230, the perimeter defense system 270 is configured to determine that none of the web servers 250 are protected by a web application firewall (WAF). Accordingly, the perimeter defense system 270 is configured to send inputs for causing enabling of a WAF in detection mode on a web server 250 that is the destination for the traffic.

In a third embodiment, based on incoming traffic, the perimeter defense system 270 is configured to determine that the incoming traffic is a potential web-application type of attack. Additionally, based on communications with the security services 230, the perimeter defense system 270 is configured to determine that the web servers 250 are protected by a WAF set to detection mode. Accordingly, the perimeter defense system 270 is configured to send inputs for causing switching of the WAF from detection mode to prevention mode.

In a fourth embodiment, based on incoming traffic, the perimeter defense system 270 is configured to determine that the incoming traffic is a DoS/DDoS attack. Accordingly, the perimeter defense system 270 is configured to send inputs for causing a link load balancer among the security services 230 to reduce proximity of the link for the traffic on top of other links.

In a fifth embodiment, based on the incoming traffic, the perimeter defense system 270 is configured to determine that the incoming traffic is a DoS/DDoS attack. Accordingly, the perimeter defense system 270 is configured to send inputs to cause a traffic steering system to redirect the traffic to another system (not shown). Specifically, as an example, perimeter defense system 270 may be configured to redirect the traffic to the scrubbing center 290 for cleaning the traffic. Techniques for diverting traffic to a scrubbing center are described further in U.S. patent application Ser. No. 14/640,814, assigned to the common assignee, the contents of which are incorporated by reference.

It should be noted that a single ADC 240 is shown in the second network 220 of FIG. 2 merely for simplicity purposes and without limitation on the disclosed embodiments. Multiple ADCs may be utilized, and each ADC may be located in-line in the second network 220 or in the perimeter without departing from the scope of the disclosure. It should be further noted that various embodiments are described herein with respect to determining a potential cyber-attack merely for simplicity purposes and without limitation on the disclosed embodiments. Multiple potential cyber-attacks may be determined without departing from the scope of the disclosure.

Figure 3:
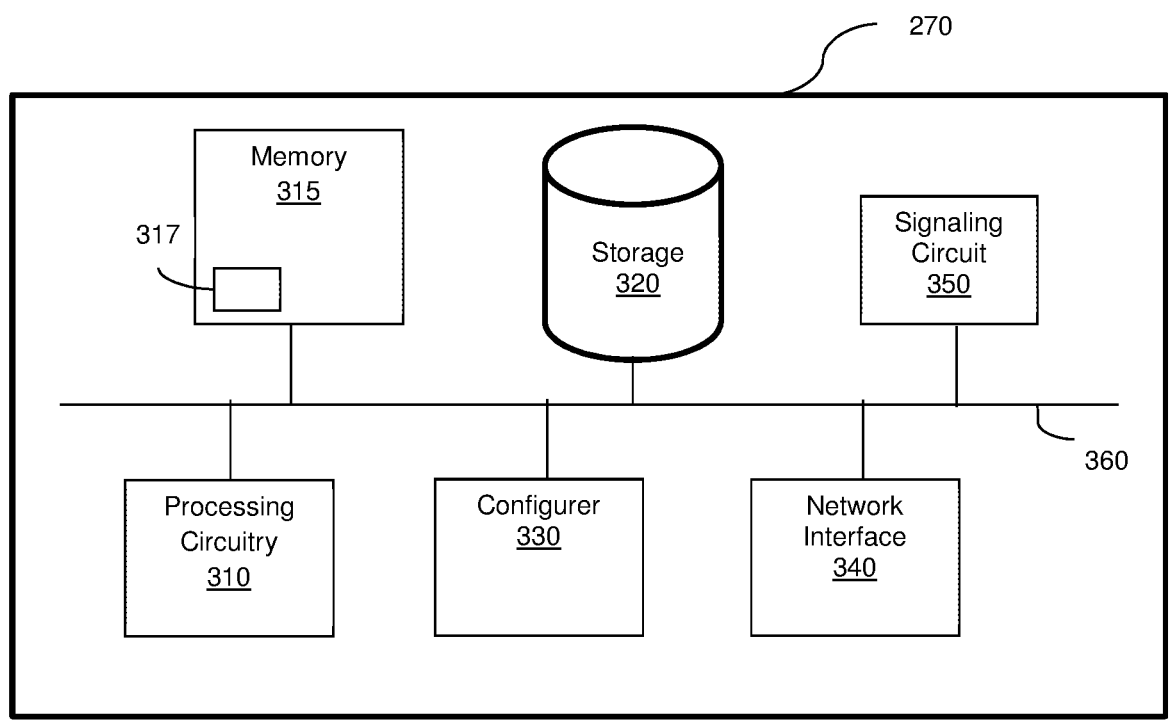
FIG. 3 is a block diagram illustrating a perimeter defense system according to an embodiment.

FIG. 3 is an example block diagram of the perimeter defense system 270 according to an embodiment. The perimeter defense system 270 includes a processing circuitry 310 coupled to a memory 315, a storage 320, a configurer 330, a network interface 340, and a signaling circuit 350. In an embodiment, the components of the perimeter defense system 270 may be communicatively connected via a bus 360.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 315 may be volatile (e.g., RAM, etc.), non-volatile (e.g., ROM, flash memory, etc.), or a combination thereof. In one configuration, computer readable instructions to implement one or more embodiments disclosed herein may be stored in the storage 320.

In another embodiment, the memory 315 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 310 to perform the various processes described herein. Specifically, the instructions, when executed, cause the processing circuitry 310 to perform an on-demand authorization of access to protected resources, as discussed hereinabove. In a further embodiment, the memory 315 may further include a memory portion 317 including the instructions.

The storage 320 may be magnetic storage, optical storage, and the like, and may be realized, for example, as flash memory or other memory technology, CD-ROM, Digital Versatile Disks (DVDs), or any other medium which can be used to store the desired information. The storage 320 may store communication consumption patterns associated with one or more communications devices.

In an embodiment, the configurer 330 is configured to determine potential cyber-attacks based on traffic received at the perimeter defense system 270. The traffic may be incoming traffic, outgoing traffic, or both. In an embodiment, the configurer 330 is configured to receive, from an external source configured to detect suspicious traffic, an indication of whether the traffic is suspicious. In another embodiment, the configure 330 may be configured to detect suspicious traffic. As an example, the detection of traffic suspected as being a DoS/DDoS attack may be based on network and bandwidth statistics, such as an average number of active connections, an average number of packets received per second, and so on. Other techniques, discussed in the related art, for detection of suspected threats or attacks can be implemented by the configurer 330. To this end, the configurer 330 may be further configured to determine whether the traffic is abnormal based on at least one traffic parameter of the incoming or outgoing traffic. Abnormal traffic may be determined to be an attack. In a further embodiment, the configurer 330 is configured to further determine a type of attack (e.g., DoS, DDoS, brute force, backdoor, phishing, and the like).

In an embodiment, based on the detection of the attack, the type of attack, the at least one traffic parameter, or a combination thereof, the configurer 330 is configured to identify at least one protection resource (e.g., the security services 230, the ADC 240, a combination thereof, and the like) to be reconfigured as well as to determine at least one input for reconfiguring each identified protection resource to detect the attack, mitigate the attack, or both. In a further embodiment, the protection resources to be reconfigured and the inputs may be determined further based on communications with the protection resources. The communications may be performed via the signaling circuit 350 as described below.

The network interface 340 allows the perimeter defense system 270 to communicate with the first network 210, the security services 230, and the ADC 240, in order to receive traffic, to send signals including inputs, to receive information related to status of the security services 230 and the ADC 240, or a combination thereof.

The signaling circuit 350 is configured to send, via the network interface 340, signals indicating the inputs determined by the configurer 330 to the security services 230 and to the ADC 240. The signaling circuit 350 may be further configured to receive, via the network interface 340, signals indicating information related to status of the security services 230 and the ADC 240, and to determine, based on the received signals, a status of each of the security services 230 and of the ADC 240. The signaling circuit 350 may send the determined statuses to the configurer 330.

It should be understood that the embodiments described herein are not limited to the specific architecture illustrated in FIG. 3, and other architectures may be equally used without departing from the scope of the disclosed embodiments.

Figure 4:
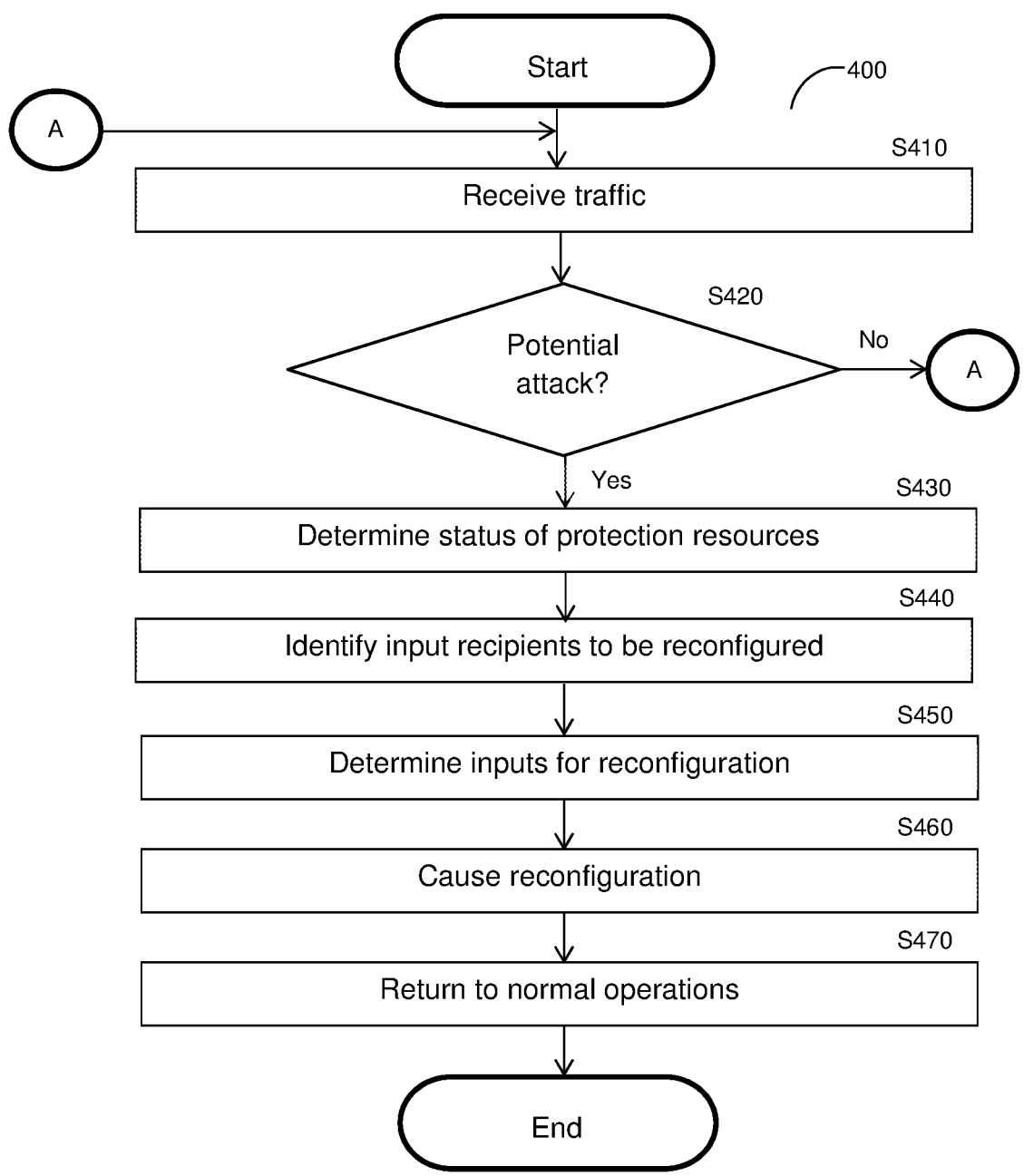
FIG. 4 is a flowchart illustrating a method for perimeter defense of a network system according to an embodiment.

FIG. 4 is an example flowchart 400 illustrating a method for perimeter defense of a network system according to an embodiment. In an embodiment, the method may be performed by the perimeter defense system 270. As a non-limiting example, the network system may be a datacenter including protected entities such as web servers.

At S410, traffic is received. The traffic may be incoming traffic directed at a network system including at least one protected entity, outgoing traffic from the network system, or both. Each protected entity may be, but is not limited to, an application, a service, a database, data objects, a server, and the like. The server may be a web server, an application server, and the like.

At S420, it is determined whether the received traffic includes a potential cyber-attack and, if so, execution continues with S440; otherwise, execution continues with S410. In an embodiment, S420 includes detecting the potential cyber-attack. Potential cyber-attacks may include, but are not limited to, DoS, DDoS, network intrusion, web application types of attacks (e.g., SQL injection, cross-site scripting, etc.), and the like.

In another embodiment, S420 may include receiving, from an external source configured to detect potential cyber-attacks, one or more threat indications of whether the traffic includes a potential cyber-attack. The threat indications may include, for example, an attack alarm, a high number of active connections, a high number of packets received per second, an indication that an incoming traffic is from an IP address included in a black list, indications collected from client authentication services (e.g., Radius servers, LDAP servers, "call-back" procedures, etc.), geo analysis information (e.g., the origin of a client's traffic in comparison to other clients), a type of content, an application accessed by the client, behavioral analysis (e.g., comparing the clients' behavior to a normal behavior of the client), a combination thereof, and so on. In yet a further embodiment, S420 may include analyzing the attack indications to determine if an attack is being committed against the protected entities At S430, a status of at least one protection resource in the network system is determined. Each protection resource may be, but is not limited to, a security service (e.g., one of the security services 230), an application delivery controller (e.g., the ADC 240), and the like. The status of each protection resource may be determined based on signals received from the protection resource. The status may include, but is not limited to, availability, load, threats which the protection resource can be configured to mitigate, applicable service-level agreements, combinations thereof, and the like.

At S440, based on the determination of a potential cyber-attack and the status determined for each protection resource in the network system, at least one protection resource to be reconfigured for attack mitigation is identified. In an embodiment, S450 includes determining a type of the potential cyber-attack (e.g., DoS, DDoS, phishing, brute force, etc.) based on the analysis of the suspicious traffic. In a further embodiment, the identification may include, but is not limited to, determining whether each protection resource can be configured to mitigate the determined type of potential cyber-attack, whether each protection resource has sufficient availability to process the traffic, a combination thereof, and the like.

At S450, based on the determination of the potential cyber-attack, at least one input for reconfiguring each protection resource identified to be reconfigured to mitigate the attack is determined.

At S460, each identified protection resource is caused to be reconfigured based on the determined at least one input. In an embodiment, S460 may include sending a signal to each protection resource to be reconfigured. Such a signal indicates the determined at least one input for the protection resource.

At optional S470, upon traffic returning to normal, each input recipient may be caused to be reconfigured for normal operation (i.e., a default or otherwise non-attack configuration). In an embodiment, traffic may be determined to be returned to normal when the potential cyber-attack is determined to be over. In a further embodiment, a potential cyber-attack may be over when it is determined that the potential cyber-attack has ended or been mitigated.

Figure 5:
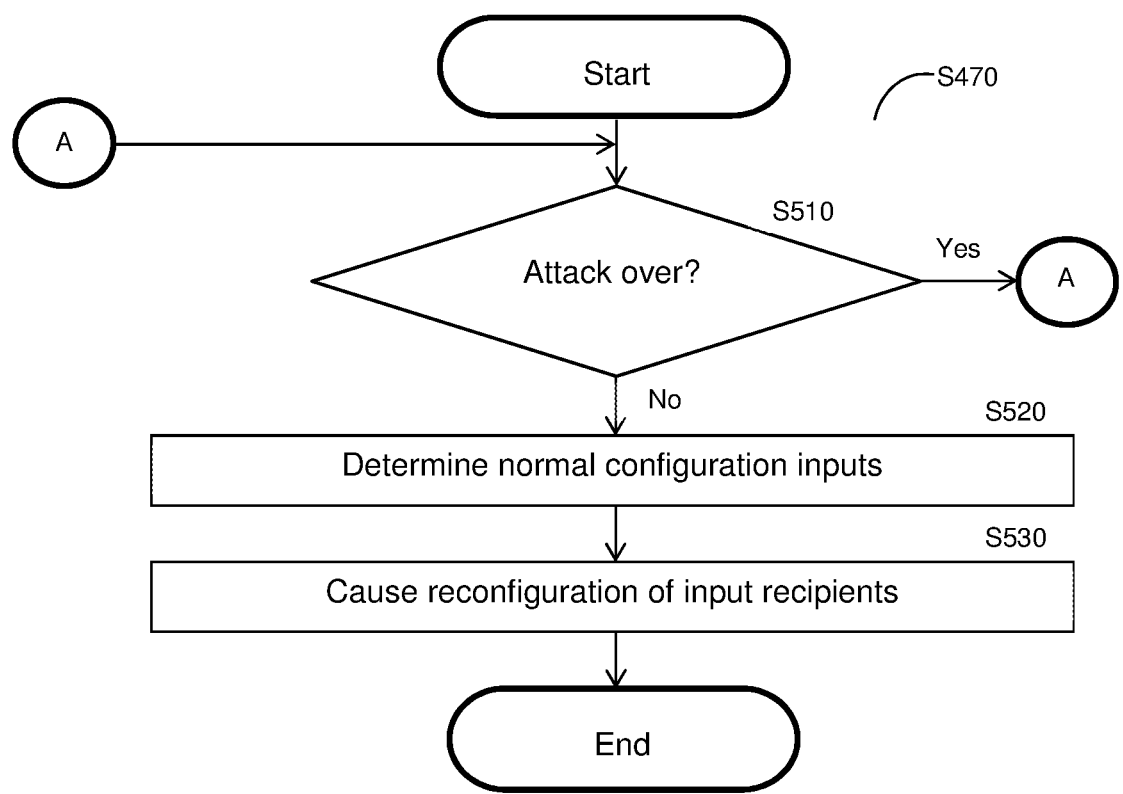
FIG. 5 is a flowchart illustrating a method for resuming normal operations after detecting a cyber-attack according to an embodiment.

FIG. 5 is an example flowchart S470 illustrating resuming normal activity of attack mitigation systems in a network after a potential cyber-attack is over according to an embodiment. As an example network, the network may be a datacenter including a plurality of servers configured to access one or more databases. At S510, it is determined whether the potential cyber-attack attack is over and, if so, execution continues with S520; otherwise, execution returns to S510. In an embodiment, the potential cyber-attack may be determined to be over when the potential cyber-attack has ended or been mitigated. At optional S520, upon determining that the potential cyber-attack has ended or been mitigated, at least one normal configuration input for each input recipient may be determined. Each normal configuration input may be based on, but not limited to, a default configuration of the input recipient. At S530, each input recipient is caused to be reconfigured for normal operation. In an embodiment, S530 includes sending a signal to each input recipient based on the at least one normal configuration input determined for the input recipient. In an alternative embodiment, S530 may include sending a signal to each input recipient with an indication that the input recipient should return to its default configuration.

It should be noted that various embodiments described herein are discussed with respect to protection resources including an ADC and a plurality of security services merely for simplicity purposes and without limitation on the disclosed embodiments. The protection resources may include multiple ADCs without departing from the scope of the disclosure. Additionally, the protection resources may include other resources such as, but not limited to load balancers.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for perimeter defense of a network, comprising:
   receiving some traffic flowing in at least one direction between the network and another network at a system which is external to the network and to the other network, wherein the network includes a plurality of protection resources and at least one entity to be protected, wherein there is no network that performs routing between the network and the other network for the received traffic;
   determining, based on the received traffic, the existence of at least one potential cyber-attack against at least one of the at least one entity to be protected;
   determining, based on the received traffic, at least one input for reconfiguring each of the at least one protection resource, and wherein the at least one input for each protection resource to be reconfigured includes at least an assignment of a workflow scheme; and
   upon determining the existence of the at least one potential cyber-attack against the at least one of the at least one entity to be protected, causing, by the system, a mitigation reconfiguration of at least one protection resource of the plurality of protection resources, wherein the mitigation reconfiguration includes reconfiguring each of the at least one protection resource to mitigate the at least one potential cyber-attack against the at least one of the at least one entity to be protected.

2. The method of claim 1, further comprising:
   determining at least one parameter of the received traffic, wherein the at least one potential cyber-attack is determined based on the determined at least one parameter.

3. The method of claim 1, further comprising:
   receiving, from an external source configured to detect suspected threats, at least one indication of whether the received traffic is suspicious, wherein the at least one potential cyber-attack is determined based on the at least one indication.

4. The method of claim 3, further comprising:
   analyzing the at least one indication, wherein the at least one potential cyber-attack is determined further based on the analysis of the at least one indication.

5. The method of claim 1, further comprising:
   receiving, at the system deployed in the perimeter of the network, subsequent traffic;
   determining, based on the subsequent traffic, whether the at least one potential cyber-attack is over; and
   upon determining that the at least one potential cyber attack is over, causing, via the system deployed in the perimeter of the network, a default reconfiguration of the at least one protection resource, wherein the default reconfiguration includes reconfiguring each of the at least one protection resource to a default configuration.

6. The method of claim 1, further comprising:
   determining a status of each of the plurality of protection resources; and
   determining, based on the determined statuses and the received traffic, the at least one protection resource to be reconfigured by the mitigation reconfiguration.

7. The method of claim 4, further comprising:
   determining, based on the received traffic, at least one type of the at least one potential cyber-attack, wherein the at least one protection resource to be reconfigured is determined further based on the determined at least one type.

8. The method of claim 1, further comprising:
   determining, based on the received traffic, at least one input for reconfiguring each of the at least one protection resource.

9. The method of claim 8, wherein the at least one input for reconfiguring each of the at least one protection resource is determined further based on at least one property associated with the protection resource.

10. The method of claim 1, wherein the at least one input for each protection resource to be reconfigured further includes a reassignment of a workflow scheme.

11. A non-transitory computer readable medium having stored thereon instructions for causing one or more processing units to execute a method, the method comprising:
    receiving some traffic flowing in at least one direction between the network and another network at a system which is external to the network and to the other network, wherein the network includes a plurality of protection resources and at least one entity to be protected, wherein there is no network that performs routing between the network and the other network for the received traffic;
    determining, based on the received traffic, the existence of at least one potential cyber-attack against at least one of the at least one entity to be protected;
    upon determining the existence of the at least one potential cyber-attack against the at least one of the at least one entity to be protected, causing, by the system, a mitigation reconfiguration of at least one protection resource of the plurality of protection resources, wherein the mitigation reconfiguration includes reconfiguring each of the at least one protection resource to mitigate the at least one potential cyber-attack against the at least one of the at least one entity to be protected;
    determining, based on the received traffic, at least one input for reconfiguring each of the at least one protection resource, and wherein the at least one input for each protection resource to be reconfigured includes at least nn assignment of a workflow scheme; and
    upon determining the existence of the at least one potential cyber-attack, causing, by the system, a mitigation reconfiguration of at least one protection resource of the plurality of protection resources, wherein the mitigation reconfiguration includes reconfiguring each of the at least one protection resource to mitigate the at least one potential cyber-attack.

12. A perimeter defense system for protecting a network, comprising:
    a processing circuitry; and
    a memory, the memory containing instructions that, when executed by the processing circuitry, configure the perimeter defense system to:
    receive some traffic flowing in at least one direction between the network and another network at a system which is external to the network and to the other network, wherein the network includes a plurality of protection resources and at least one entity to be protected, wherein there is no network that performs routing between the network and the other network for the received traffic;
    determine, based on the received traffic, the existence of at least one potential cyber-attack against at least one of the at least one entity to be protected;
    determine, based on the received traffic, at least one input for reconfiguring each of the at least one protection resource, and wherein the at least one input for each protection resource to be reconfigured includes at least an assignment of a workflow scheme; and upon determining the existence of the at least one potential cyber-attack against the at least one of the at least one entity to be protected, the system causes a mitigation reconfiguration of at least one protection resource of the plurality of protection resources, wherein the mitigation reconfiguration includes reconfiguring each of the at least one protection resource to mitigate the at least one potential cyber-attack against the at least one of the at least one entity to be protected.

13. The perimeter defense system of claim 12, wherein the perimeter defense system is further configured to:
determine at least one parameter of the received traffic, wherein the at least one potential cyber-attack is determined based on the determined at least one parameter.

14. The perimeter defense system of claim 12, wherein the perimeter defense system is further configured to:
receiving, from an external source configured to detect suspected threats, at least one indication of whether the received traffic is suspicious, wherein the at least one potential cyber-attack is determined based on the at least one indication.

15. The perimeter defense system of claim 14, wherein the perimeter defense system is further configured to:
analyzing the at least one indication, wherein the at least one potential cyber-attack is determined further based on the analysis of the at least one indication.

16. The perimeter defense system of claim 12, wherein the perimeter defense system is further configured to:
receive subsequent traffic;
determine, based on the subsequent traffic, whether the at least one potential cyber-attack is over; and upon determining that the at least one potential cyber attack is over, cause a default reconfiguration of the at least one protection resource, wherein the default reconfiguration includes reconfiguring each of the at least one protection resource to a default configuration.

17. The perimeter defense system of claim 12, wherein the perimeter defense system is further configured to:
determine a status of each of the plurality of protection resources; and
determine, based on the determined statuses and the received traffic, the at least one protection resource to be reconfigured by the mitigation reconfiguration.

18. The perimeter defense system of claim 15, wherein the perimeter defense system is further configured to:
determine, based on the received traffic, at least one type of the at least one potential cyber-attack, wherein the at least one protection resource to be reconfigured is determined further based on the determined at least one type.

19. The perimeter defense system of claim 12, wherein the perimeter defense system is further configured to:
determine, based on the received traffic, at least one input for reconfiguring each of the at least one protection resource.

20. The perimeter defense system of claim 19, wherein the at least one input for reconfiguring each of the at least one protection resource is determined further based on at least one property associated with the protection resource.

21. The perimeter defense system of claim 12, wherein the at least one input for each protection resource to be reconfigured further includes a reassignment of a workflow scheme.

* * * * *